US011067758B1

United States Patent
Chen

(10) Patent No.: US 11,067,758 B1
(45) Date of Patent: Jul. 20, 2021

(54) DUPLEX FIBER OPTIC ADAPTER

(71) Applicant: EZCONN CORPORATION, Taipei (TW)

(72) Inventor: Szu ming Chen, New Taipei (TW)

(73) Assignee: EZconn Corporation, Taipei (TW)

(*) Notice: Subject to any disclaimer, the term of this patent is extended or adjusted under 35 U.S.C. 154(b) by 0 days.

(21) Appl. No.: 16/741,775

(22) Filed: Jan. 14, 2020

(51) Int. Cl.
G02B 6/38 (2006.01)
G02B 6/27 (2006.01)

(52) U.S. Cl.
CPC ......... *G02B 6/3825* (2013.01); *G02B 6/2726* (2013.01); *G02B 6/3879* (2013.01); *G02B 6/3885* (2013.01)

(58) Field of Classification Search
CPC .................................................. G02B 6/3879
See application file for complete search history.

(56) References Cited

U.S. PATENT DOCUMENTS 6,102,581 A * 8/2000 Deveau ............. G02B 6/266
385/139
D678,205 S * 3/2013 Shifris .................. D13/133

* cited by examiner

Primary Examiner — Omar R Rojas

(57) ABSTRACT

A duplex fiber optic adapter, comprising a pair of fiber optic connector assemblies, a housing and a pair of ports positioned within the housing is provided. The housing has a pair of opening structures on one end, configured for fixed attachment of the pair of fiber optic connector assemblies, and a pair of polarity reversal connector openings on an opposing end, configured to receive a pair of ferrules of a fiber optic connector. When a fiber optic connector is inserted into the adapter and the adapter is coupled to a mating fiber optic connector, the pair of ferrules is engaged in the pair of ports of the housing and coupling ferrules of each pair of fiber optic connector assemblies is engaged in a pair of ports of the mating fiber optic connector, establishing a polarity reversal connection between the fiber optic connector and mating fiber optic connector via the adapter.

4 Claims, 13 Drawing Sheets

DUPLEX FIBER OPTIC ADAPTER

TECHNICAL FIELD

Example embodiments relate generally to the field of optical communications and, more particularly, to duplex fiber optic adapters.

BACKGROUND

Driven by the ever-growing computing demands of cloud users, generation of massive amounts of data by edge computing devices such as AI-enabled IoT devices, and roll-out of 5G networks, the architectures of hyperscale, colocation and on-premise data centers have rapidly evolved and new data centers closer to end-users or devices have been built as the demand for services that rely on edge data centers increase.

For data centers, whether it's new builds or network upgrades, proper cabling infrastructure is required for successful application delivery within the data centers. The cabling infrastructure must be reliable, easy to install, modular and flexible, to accommodate changes, and scalable, to support data center growth. In general, the cabling infrastructure connects the end and intermediate points of traffic patterns within the data centers to and from routers, interconnection switches, access switches, servers, SAN switches and storage. Of the types of cabling employed in data centers, fiber optic cables support high data rates for high-speed network interfaces and protocol standards.

Generally, for installation of fiber optic cables, pre-connectorized fiber optic cables may be utilized for snap fit connections. The connectors mechanically couple and align core fibers and allow for the efficient transfer of light. Generally, the connectors comprise of cables, ferrules, a connector body, and a coupling device. Of the fiber optic cable connectors, such as Lucent connectors (LC), square connectors (SC) and MPO connectors, LC duplex fiber optic connectors are fiber optic connectors with a pair of multi-mode fiber (MMF) or singlemode fiber (SMF), that transmit data in two opposite directions, one in each optical fiber. For example, a transmit signal (Tx) port and receiver (Rx) port of an LC duplex fiber optic connector should always be connected to a receiver (Rx) port and a transmit signal (Tx) port of a corresponding LC duplex fiber optic connector, respectively. Polarity is the direction of a light signal travelling through an optical fiber. As an example, LC duplex fiber optic connectors may generally be utilized for single-lane transceivers, such as 10G or 25G SFP, or for wavelength multiplexing, such as CWDM4, SWDM4 or BiDi, in the same fiber pair, and are connected using LC duplex fiber optic adapters.

An LC duplex fiber optic adapter joins and aligns the connectors of two LC duplex fiber optic cables together. An important feature for optical fiber connection is the precise alignment of each optical fiber core. The alignment is influenced by a ferrule within each connector and an alignment port within each adapter, bringing together the ferrules of the two connectors being mated within the adapter's port, and at its approximate midpoint.

With new data centers being built and existing data centers being upgraded the problem of poor fiber connection alignment and/or crossing of fiber optic cables during installation have increased. Often, there are multiple adapters and optic fiber segments connected in a data center, with the polarity of the connectors used changing not just once, but, several times during deployment. When switching of polarities is required, often, the connectors are re-terminated. However, this manual procedure is time-consuming, increases the risk of human error, and in some instances, require special tools for completion. A wrong connection, results in non-precise alignment of the optical fiber cores, signal degradation, damaged equipment or devices, or signals not being transmitted. Also, multiple changing of optic fiber polarities, wherein any manual adjustment to connectors is required, further increases the risk of non-precise alignment of the optical fiber cores.

SUMMARY

Duplex fiber optic adapters, fiber optic systems, and a method of preparing an optic fiber assembly are provided.

In an embodiment, a duplex fiber optic adapter comprises a pair of fiber optic connector assemblies, a housing and a pair of ports positioned within the housing. The pair of fiber optic connector assemblies is configured to couple to a mating fiber optic connector. Each of the fiber optic connector assemblies includes an optic fiber assembly having an optical fiber core, a coupling ferrule, a connecting ferrule and a stabilizing component. The coupling ferrule is fixedly attached to the stabilizing component on one end and protrudes outwardly therefrom and the connecting ferrule is fixedly attached to the stabilizing component on an opposite end and protrudes outwardly therefrom. The optical fiber core is positioned at a central axis therein.

The housing having a pair of opening structures on one end thereof is configured for fixed attachment of the pair of fiber optic connector assemblies, respectively, and a pair of polarity reversal connector openings on an opposing end of the housing, opposite the pair of opening structures is configured to receive a pair of ferrules of a fiber optic connector. The pair of ports positioned within the housing is configured to receive the pair of ferrules of the fiber optic connector and each connecting ferrule of the optic fiber assemblies, respectively, and establish an optical connection therebetween.

When the fiber optic connector is inserted into the adapter and the pair of fiber optic connector assemblies of the adapter are coupled to the mating fiber optic connector, latch clip assemblies of the fiber optic connector are engaged within the pair of polarity reversal connector openings and the pair of ferrules is engaged in the pair of ports of the housing, respectively, and latch clip assemblies of the pair of fiber optic connector assemblies are engaged within the mating fiber optic connector and each coupling ferrule is engaged in a pair of ports of the mating fiber optic connector, whereby a polarity reversal connection is established between the fiber optic connector and mating fiber optic connector via the adapter.

In some embodiments, the pair of fiber optic connector assemblies further comprise a pair of coupling housings, each configured to fixedly snap fit attach to the pair of opening structures and each having an attachment chamber and a stop lock receiving structure on one end of the attachment chamber. The stop lock receiving structure is configured to fixedly secure each optic fiber assembly therein, respectively. The shape of the stop lock receiving structures comprises at least one angle.

In some embodiments, each of the stabilizing components comprises a stop lock collar portion and a component sleeve portion integrated therewith. The shape of the stop lock collar portion comprises at least one angle and is configured to correspond to and be fixedly secured in each stop lock receiving structure, respectively, preventing, rotational movement of the stabilizing components. Each of the coupling ferrule and connecting ferrule is fixedly slide-fit attached to coupling inner stop ledges and connecting inner stop ledges of the stabilizing components from the stop lock collar portion and component sleeve portion, respectively, stabilizing and aligning each of the optical fiber cores of each of the optic fiber assemblies, respectively.

In some embodiments, each of the optic fiber assemblies further comprise an alignment sleeve fixedly attached to the stabilizing components, respectively, opposite the stop lock collar portion. A length of each alignment sleeve is greater than a length of each connecting ferrule protruding from the stabilizing component. The portion of each alignment sleeve not encompassing each connecting ferrule is slide-fit engaged to an inner stop ledge in the pair of attachment chambers, respectively, stabilizing and aligning optical fiber cores of each optic fiber assemblies to optical fiber cores of the mating connector, respectively.

A method of preparing an optic fiber assembly, whereby the optic fiber assembly is configured for optical energy transmission therethrough, comprises the following steps. First, in Step 1, an optical fiber core, a coupling ferrule having a bore extending axially therethrough, a connecting ferrule having a bore extending axially therethrough, and a stabilizing component, defining an interior channel therethrough, having an insertion opening on a side therethrough are provided. Thereafter, in Step 2, a coupling end of the coupling ferrule is fixedly slide-fit attached to a coupling inner stop ledge of the stabilizing component on one end and a connecting end of the connecting ferrule is fixedly slide-fit attached to a connecting inner stop ledge of the stabilizing component on an opposite end. The coupling inner stop ledge and connecting inner stop ledge are different stop ledges, and an insertion space is positioned between the coupling inner stop ledge and connecting inner stop ledge and communicates with the insertion opening. Next, in Step 3, epoxy is prepared and inserted into the insertion opening, filling up the insertion space and bores of the coupling ferrule and connecting ferrule, whereby a bead of epoxy protrudes from a coupling tips of the coupling ferrule and connecting tips of the connecting ferrule. Following, in Step 4 the optical fiber core is inserted through the connecting ferrule, insertion space of the stabilizing component and coupling ferrule. The length of the optical fiber core is greater than the length of the connecting ferrule, insertion space and coupling ferrule, whereby following insertion, the bead of epoxy protrudes from the coupling and connecting tip having the optical fiber therethrough. Next, in Step 5, the epoxy is cured and following, in Step 6, the coupling and connecting tip are finished.

In some embodiments of the method of preparing the optic fiber assembly, the stabilizing component further comprises a stop lock collar portion and a component sleeve portion integrated therewith, wherein the shape of the stop lock collar portion comprises at least one angle, and wherein the stop lock collar portion encompasses the coupling end and a portion of the insertion space and the component sleeve portion encompasses another portion of the insertion space and connecting end.

In some embodiments of the method of preparing, the optic fiber assembly, the optic fiber assembly further comprises an alignment sleeve fixedly attached to the stabilizing component, opposite the stop lock collar portion, whereby a length of the alignment sleeve is greater than a length of the connecting ferrule protruding from the stabilizing component.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of heatsink fins incorporating aspects of the presently disclosed principles are illustrated by way of example, and not by way of limitation.

DETAILED DESCRIPTION

Figure 1A:
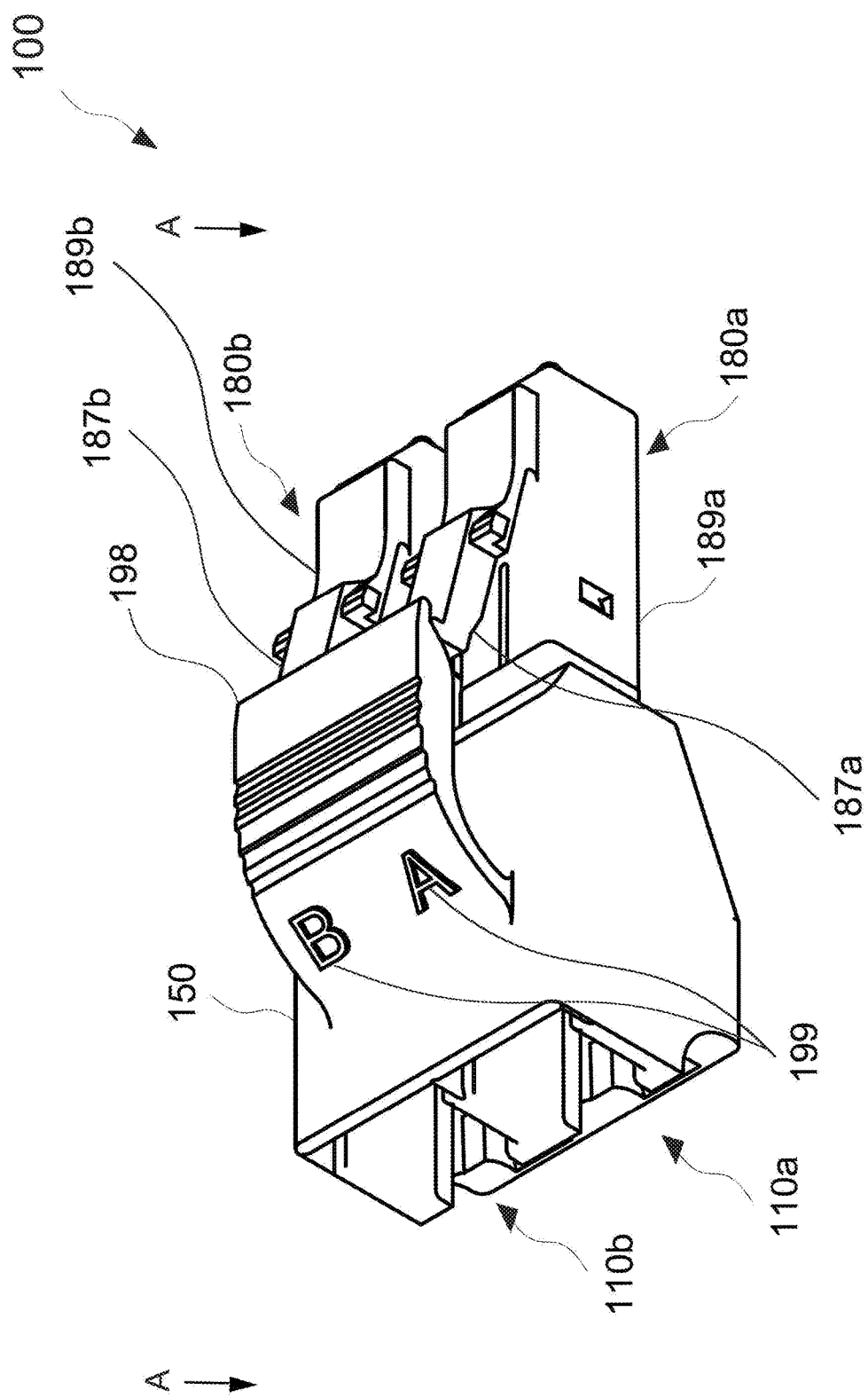
FIG. 1A is a schematic perspective first view of a duplex fiber optic adapter, according to an example embodiment.

The following describes various principles related to optical communication systems by way of reference to specific examples of cabling infrastructure, including arrangements and examples of fiber optic connectors and adapters embodying innovative concepts. More particularly, but not exclusively, such innovative principles are described in relation to selected examples of fiber optic connectors and adapters and well-known functions or constructions are be described in detail for purposes of succinctness and clarity. Nonetheless, one or more of the disclosed principles can be incorporated in various other embodiments of fiber optic connectors and adapters to achieve any of a variety of desired outcomes, characteristics, and/or performance criteria.

Thus, fiber optic connectors and adapters having attributes that are different from those specific examples discussed herein can embody one or more of the innovative principles, and can be used in applications not described herein in detail. Accordingly, embodiments of fiber optic connectors and adapters not described herein in detail also fall within the scope of this disclosure, as will be appreciated by those of ordinary skill in the relevant art following a review of this disclosure.

Example embodiments as disclosed herein are directed to duplex fiber optic adapters. In an embodiment, a duplex fiber optic adapter comprises a pair of fiber optic connector assemblies, a housing and a pair of ports positioned within the housing. The housing has a pair of opening structures on one end, configured for fixed attachment of the pair of fiber optic connector assemblies, and a pair of polarity reversal connector openings on an opposing end, configured to receive a pair of ferrules of a fiber optic connector. When a fiber optic connector is inserted into the adapter and the adapter is coupled to a mating fiber optic connector, the pair of ferrules is engaged in the pair of ports of the housing and coupling ferrules of each pair of fiber optic connector assemblies is engaged in a pair of ports of the mating fiber optic connector, establishing a polarity reversal connection between the fiber optic connector and mating fiber optic connector via the adapter.

In some embodiments the duplex fiber optic adapters may be applicable to, as an example and not to be limiting, communications equipment and patch panels, providing physical connection, to networks and devices. Generally, the connector type of the duplex fiber optic adapters of the embodiments is a duplex LC connector type. A duplex LC connector is engaged into a duplex fiber optic adapter. Those of ordinary skill in the relevant art may readily appreciate, that the duplex fiber optic adapters of the embodiments may be any even numbered port amount, as long as each LC connector comprising two opposing signals may be engaged therein, and the embodiments are not limited thereto. Those of ordinary skill in the relevant art may also readily appreciate, that the duplex fiber optic adapters of the embodiments may be stackable vertically, horizontally, or both, and secured by any bracket means known by those skilled in the relevant art or within chassis of communications equipment or panels, and the embodiments are not limited thereto.

In some embodiments, the fiber and polish types of the duplex LC connectors may be optical single mode or multimode type having varying core and cladding sizes, and PC, Ultra PC, or Angled PC polish type, respectively, and the embodiments are not limited. Generally, duplex LC connectors may be used by commercial businesses, governments, and data centers, transmitting gigabit Ethernet and video multimedia, as an example. In some embodiments, the duplex fiber optic adapters comprise low profiles and no mounting flanges for compact and efficient application.

Figure 1B:
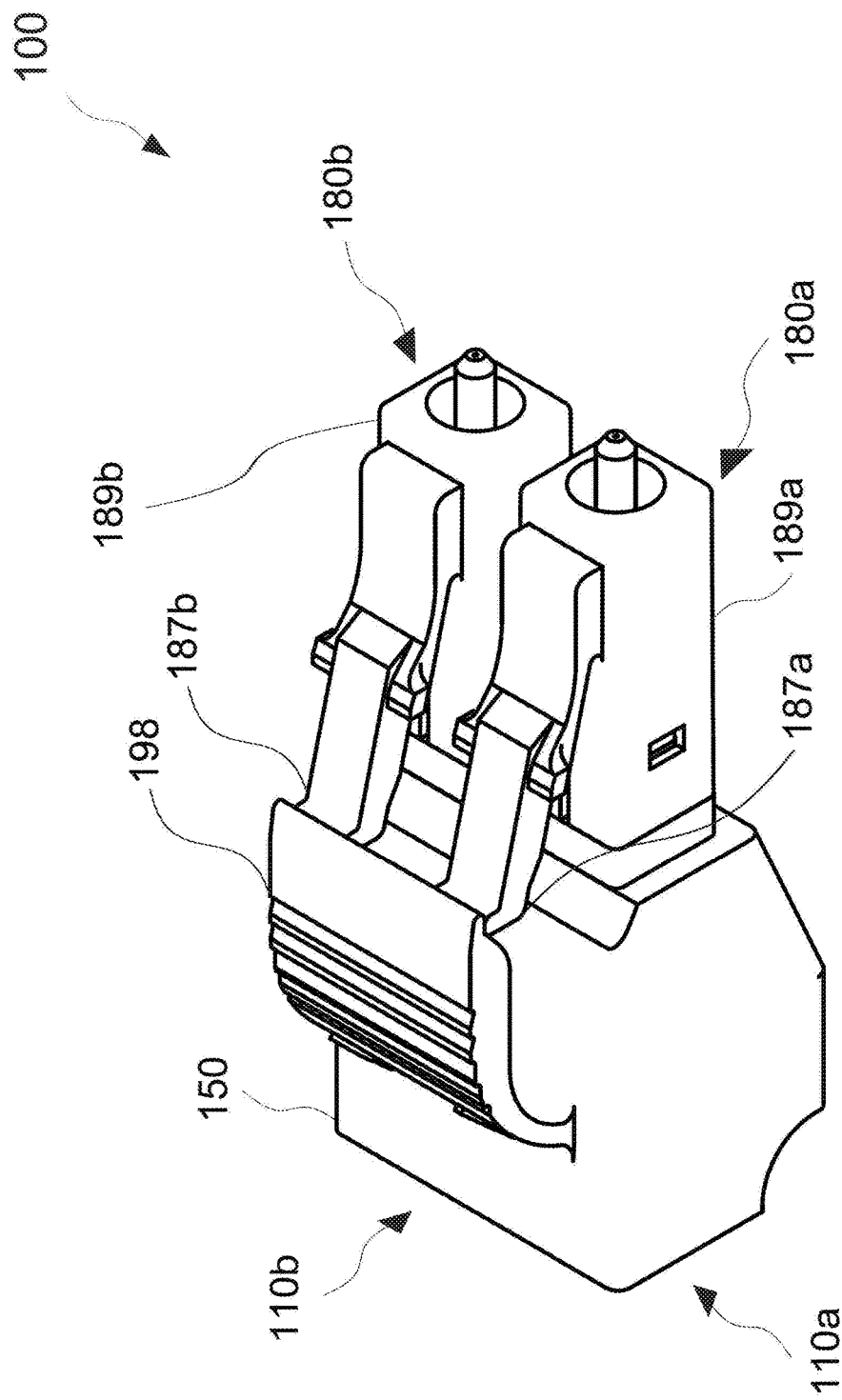
FIG. 1B is a schematic perspective second view of the duplex fiber optic adapter of FIG. 1A, according to an example embodiment.
Figure 1C:
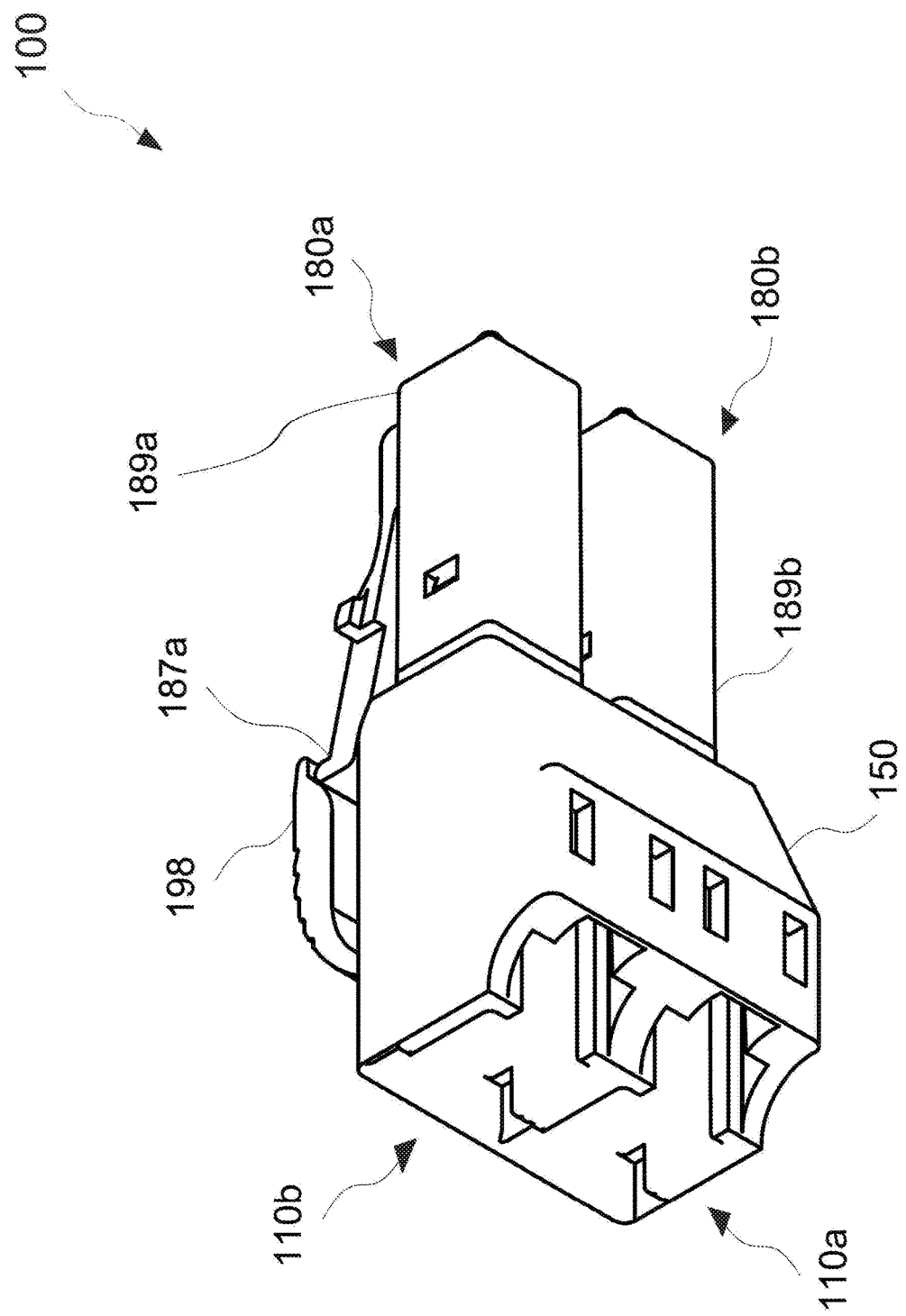
FIG. 1C is a schematic perspective third view of the duplex fiber optic adapter of FIG. 1A, according to an example embodiment.
Figure 1D:
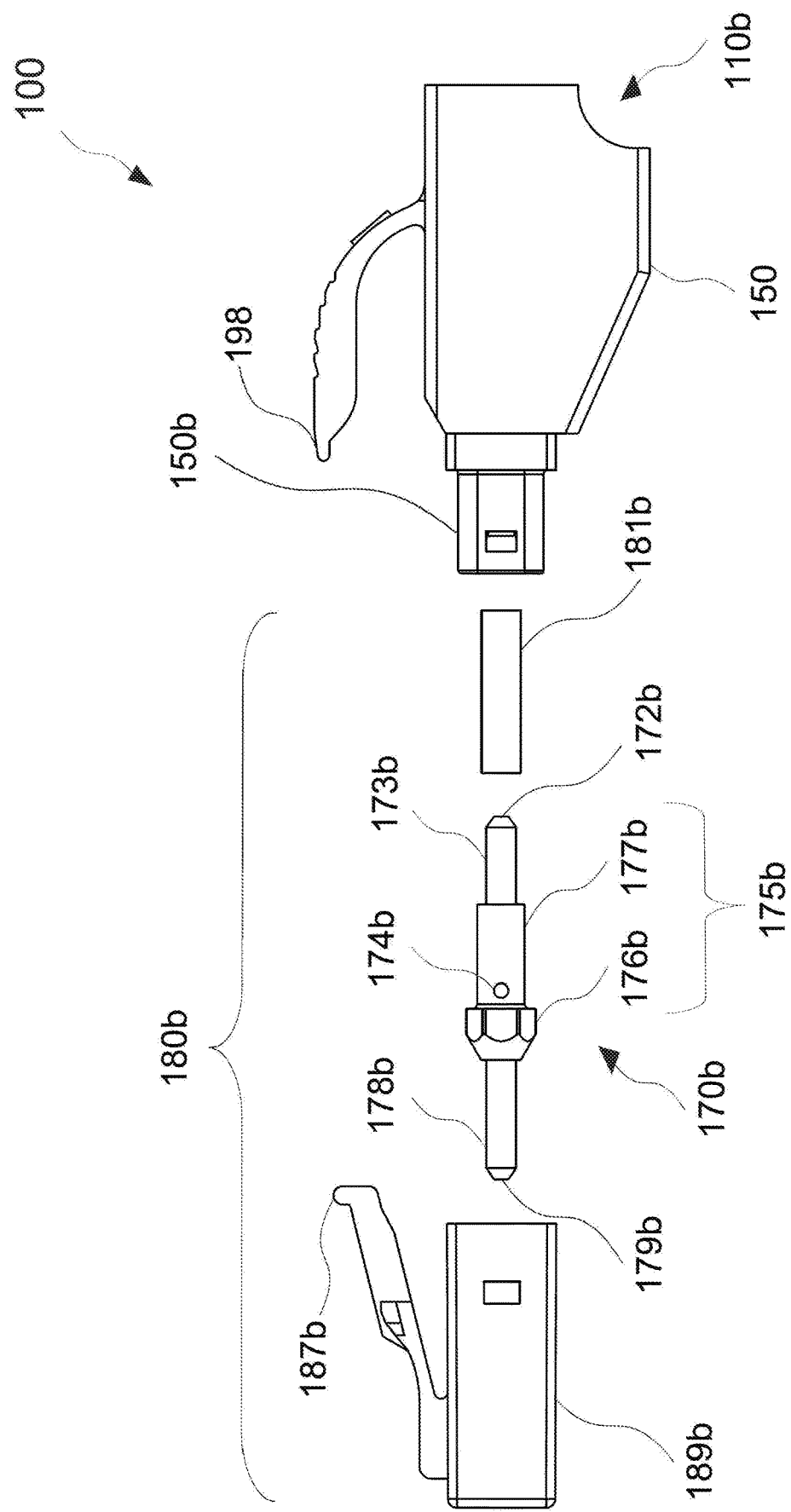
FIG. 1D is a schematic exploded view of the duplex fiber optic adapter of FIG. 1A, according to an example embodiment.

FIG. 1A is a schematic perspective first view of a duplex fiber optic adapter, according to an example embodiment. FIG. 1B is a schematic perspective second view of the duplex fiber optic adapter of FIG. 1A, according to an example embodiment. FIG. 1C is a schematic perspective third view of the duplex fiber optic adapter of FIG. 1A, according to an example embodiment. FIG. 1D is a schematic exploded view of the duplex fiber optic adapter of FIG. 1A, according to an example embodiment. Referring to FIGS. 1A to 1D in an embodiment, a duplex fiber optic adapter 100 comprising a duplex fiber optic adapter 100 comprises a pair of fiber optic connector assemblies 180a, 180b, a housing 150 and a pair of ports 120a, 120b positioned within the housing 150. The pair of fiber optic connector assemblies 180a, 180b is configured to couple to a mating fiber optic connector (not shown). Each of the fiber optic connector assemblies 180a, 180b includes an optic fiber assembly 170a, 170b having an optical fiber core 171a, 171b, a coupling ferrule 178a, 178b, a connecting ferrule 173a, 173b and a stabilizing component 175a, 175b. The coupling ferrule 178a, 178b is fixedly attached to the stabilizing component 175a, 175b on one end and protrudes outwardly therefrom and the connecting ferrule 173a, 173b is fixedly attached to the stabilizing component 175a, 175b on an opposite end and protrudes outwardly therefrom. The optical fiber core 171a, 171b is positioned at a central axis therein.

Figure 2A:
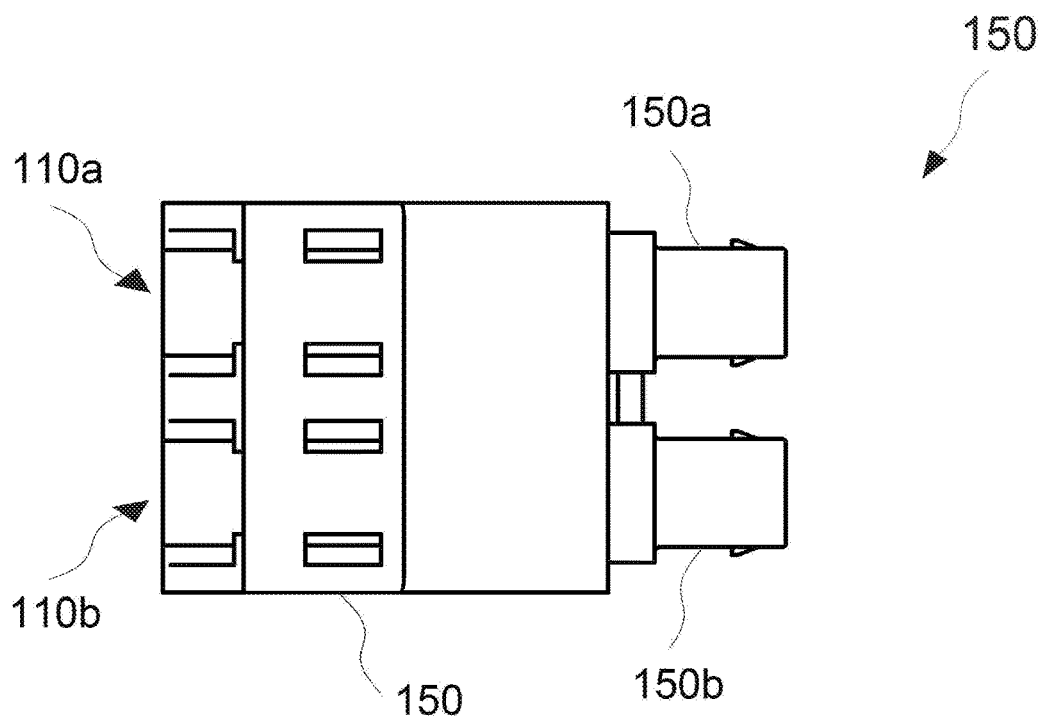
FIG. 2A is a schematic perspective bottom view of a housing having an alignment sleeve therein, according to an example embodiment.
Figure 2B:
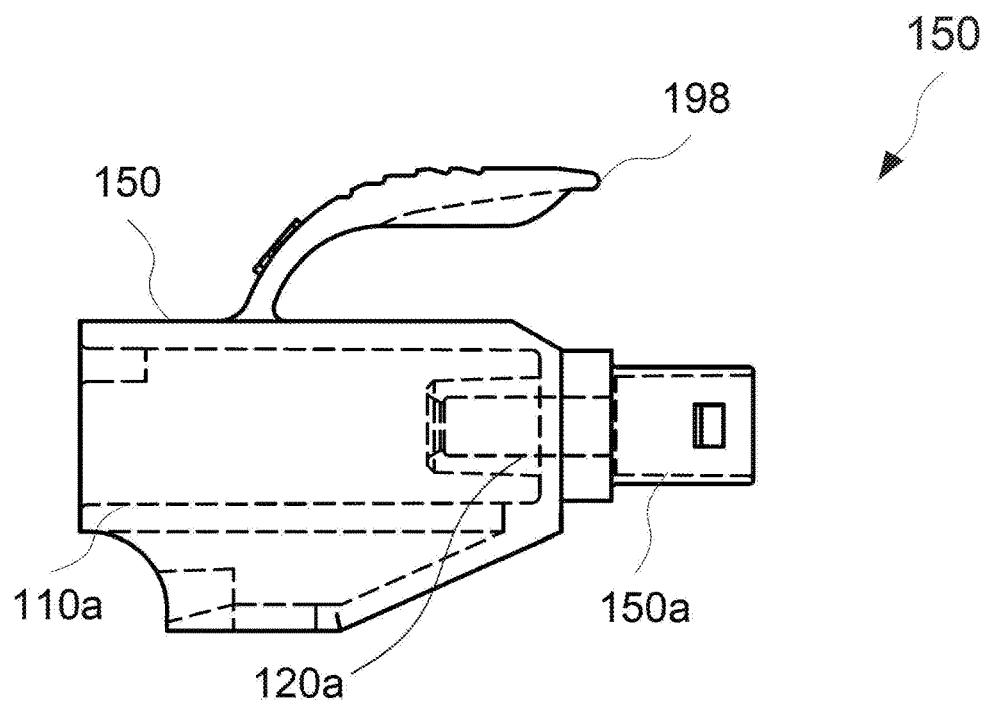
FIG. 2B illustrates an interior of the housing of FIG. 2A, according to an example embodiment.

FIG. 2A is a schematic perspective bottom view of a housing having an alignment sleeve therein, according to an example embodiment. FIG. 2B illustrates an interior of the housing of FIG. 2A, according to an example embodiment. The housing 150 having a pair of opening structures 150a, 150b on one end thereof is configured for fixed attachment of the pair of fiber optic connector assemblies 180a, 180b, respectively, and a pair of polarity reversal connector openings 110a, 110b on an opposing end of the housing 150, opposite the pair of opening structures 150a, 150b is configured to receive a pair of ferrules of a fiber optic connector (not shown). The pair of ports 120a, 120b positioned within the housing 150 is configured to receive the pair of ferrules of the fiber optic connector (not shown) and each connecting ferrule 173a, 173b of the optic fiber assemblies 170a, 170b, respectively, and establish an optical connection therebetween.

When the fiber optic connector (not shown) is inserted into the adapter 100 and the pair of fiber optic connector assemblies 180a, 180b of the adapter 100 are coupled to the mating fiber optic connector (not shown), latch dip assemblies of the fiber optic connector are engaged within the pair of polarity reversal connector openings 110a, 110b and the pair of ferrules is engaged in the pair of ports 120a, 120b of the housing 150, respectively, and latch clip assemblies of the pair of fiber optic connector assemblies 180a, 180b are engaged within the mating fiber optic connector and each coupling ferrule 178a, 178b is engaged in a pair of ports 120a, 120b of the mating fiber optic connector, whereby a polarity reversal connection is established between the fiber optic connector and mating fiber optic connector via the adapter 100.

Figure 3A:
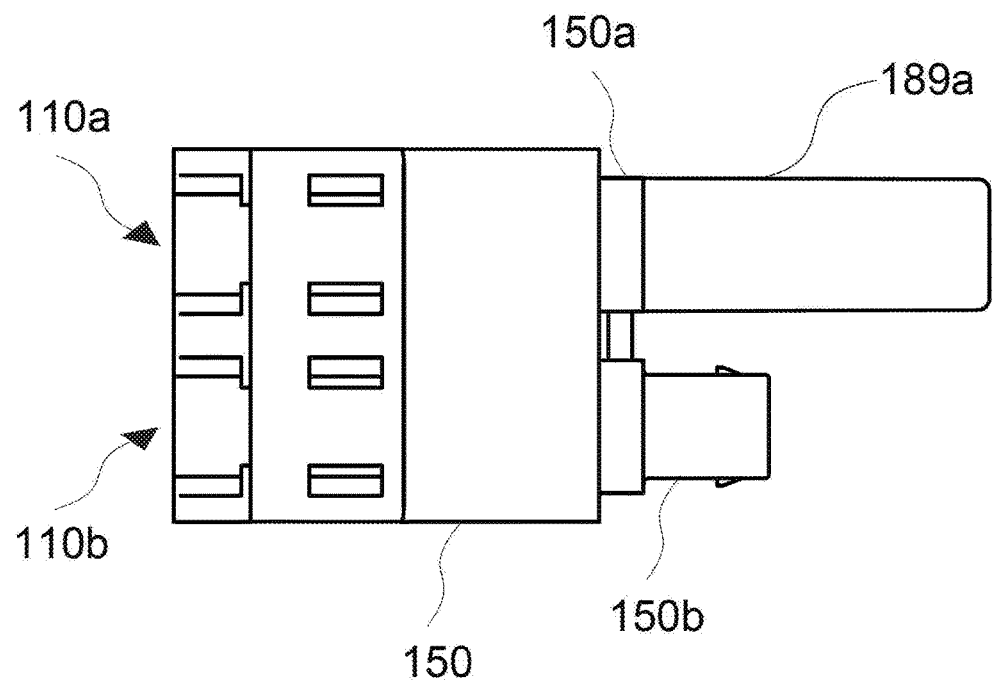
FIG. 3A is a schematic perspective bottom view of a housing having a coupling housing attached thereto, according to an example embodiment.
Figure 3B:
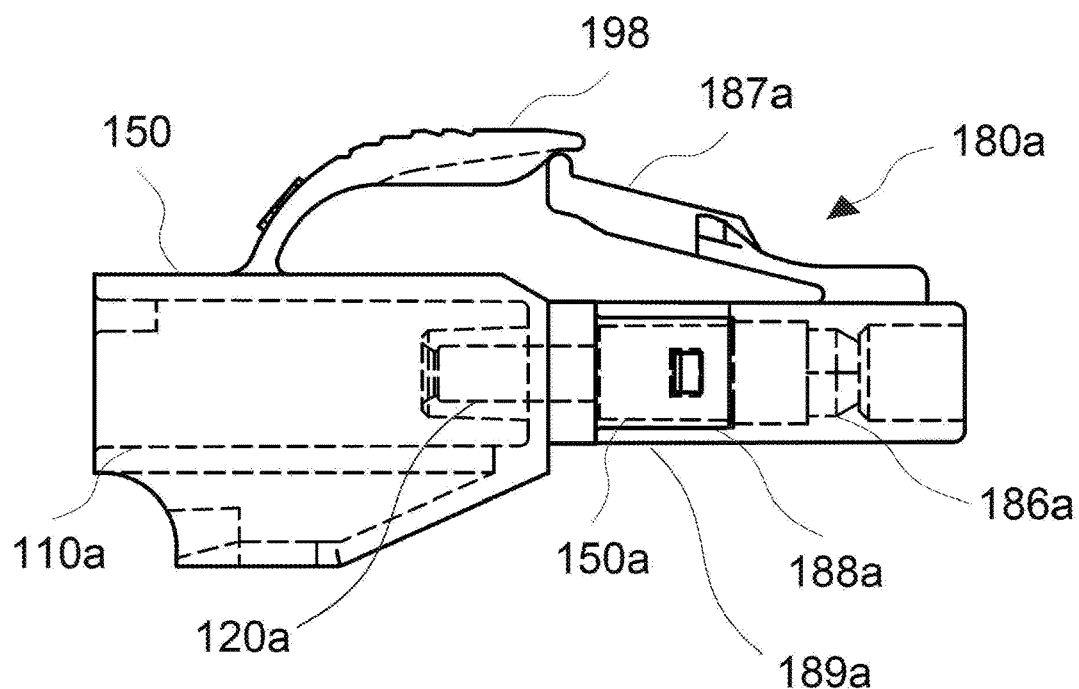
FIG. 3B illustrates an interior of the housing of FIG. 3A having a coupling housing attached thereto, according to an example embodiment.

FIG. 3A is a schematic perspective bottom view of a housing having a coupling housing attached thereto, according to an example embodiment. FIG. 3B illustrates an interior of the housing of FIG. 3A having a coupling housing attached thereto, according to an example embodiment. Referring to FIGS. 3A and 3B, and referring to FIGS. 1A to 2B, In some embodiments, the pair of fiber optic connector assemblies 180a, 180b further comprise a pair of coupling housings 189a, 189b, each configured to fixedly snap fit attach to the pair of opening structures 150a, 150b and each having an attachment chamber 188a, 188b and a stop lock receiving structure 186a, 186b on one end of the attachment chamber 188a, 188b. The stop lock receiving structure 186a, 186*b* is configured to fixedly secure each optic fiber assembly 170*a*, 170*b* therein, respectively. The shape of the stop lock receiving structures 186*a*, 186*b* comprise at least one angle.

Figure 4A:
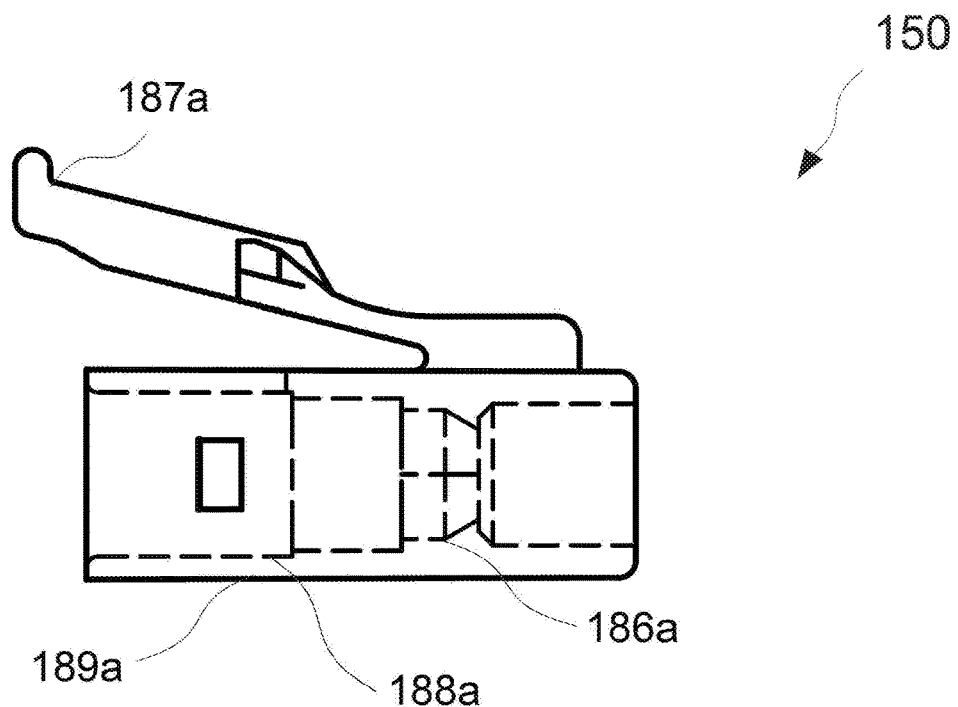
FIG. 4A illustrates an interior of a coupling housing, according to an example embodiment.
Figure 4B:
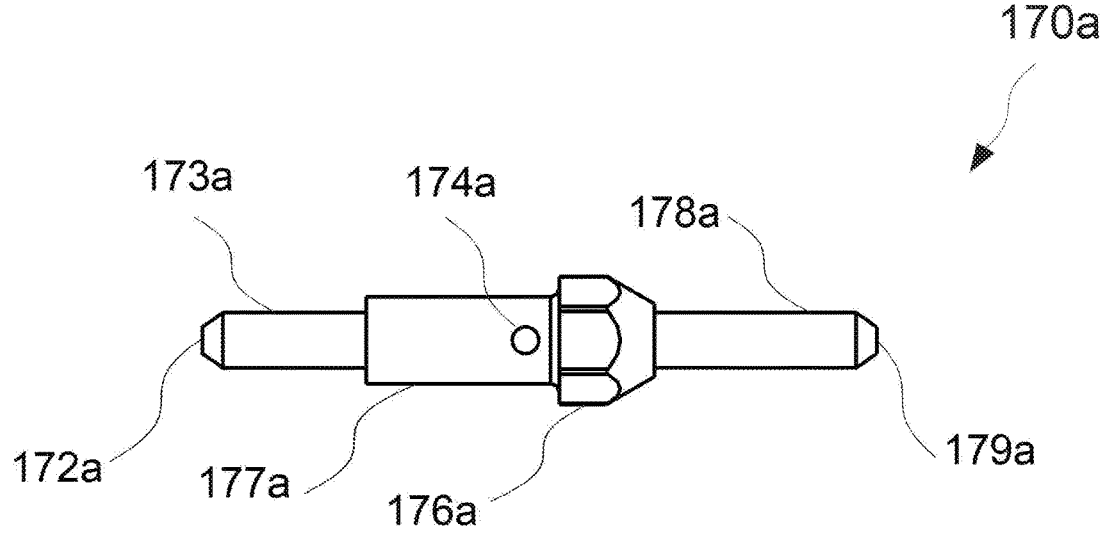
FIG. 4B is a schematic perspective view of an optic fiber assembly, according to an example embodiment.
Figure 4C:
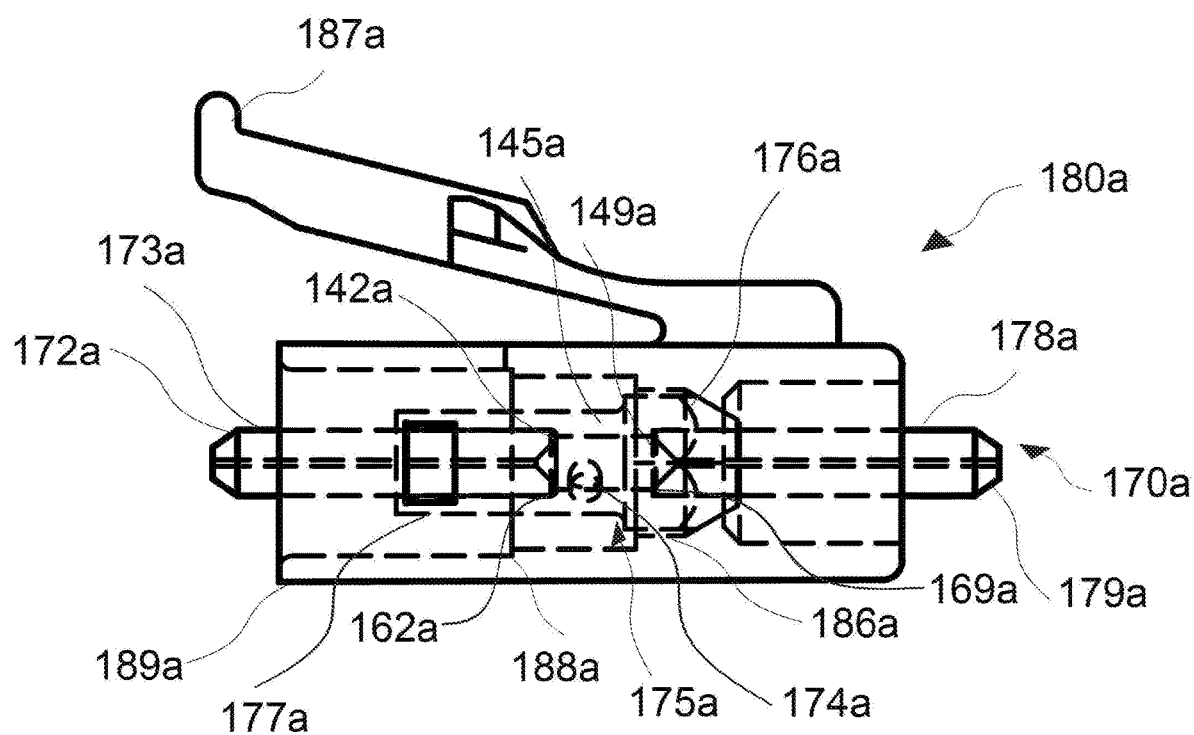
FIG. 4C illustrates an interior of the coupling housing of FIG. 4A and optic fiber assembly of FIG. 4B without an optical fiber core attached therethrough, according to an example embodiment.

FIG. 4A illustrates an interior of a coupling housing, according to an example embodiment. FIG. 4B is a schematic perspective view of an optic fiber assembly, according to an example embodiment. FIG. 4C illustrates an interior of the coupling housing of FIG. 4A and optic fiber assembly of FIG. 4B without an optical fiber core attached therethrough, according to an example embodiment. Referring to FIGS. 4A and 4B, and referring to FIGS. 1A to 3B, In some embodiments, each of the stabilizing components 175*a*, 175*b* comprises a stop lock collar 176*a*, 176*b* and a component sleeve 177*a*, 177*b* integrated therewith. The shape of the stop lock collar 176*a*, 176*b* comprises at least one angle and is configured to correspond to and be fixedly secured in each stop lock receiving structure 186*a*, 186*b*, respectively, preventing rotational movement of the stabilizing components 175*a*, 175*b*. Each of the coupling ferrule 178*a*, 178*b* and connecting ferrule 173*a*, 173*b* is fixedly slide-fit attached to coupling inner stop ledges 149*a*, 149*b* and connecting inner stop ledges 142*a*, 142*b* of the stabilizing components 175*a*, 175*b* from the stop lock collar 176*a*, 176*b* and component sleeve 177*a*, 177*b*, respectively, stabilizing and aligning each of the optical fiber cores 171*a*, 171*b* of each of the optic fiber assemblies 170*a*, 170*b*, respectively.

Figure 5A:
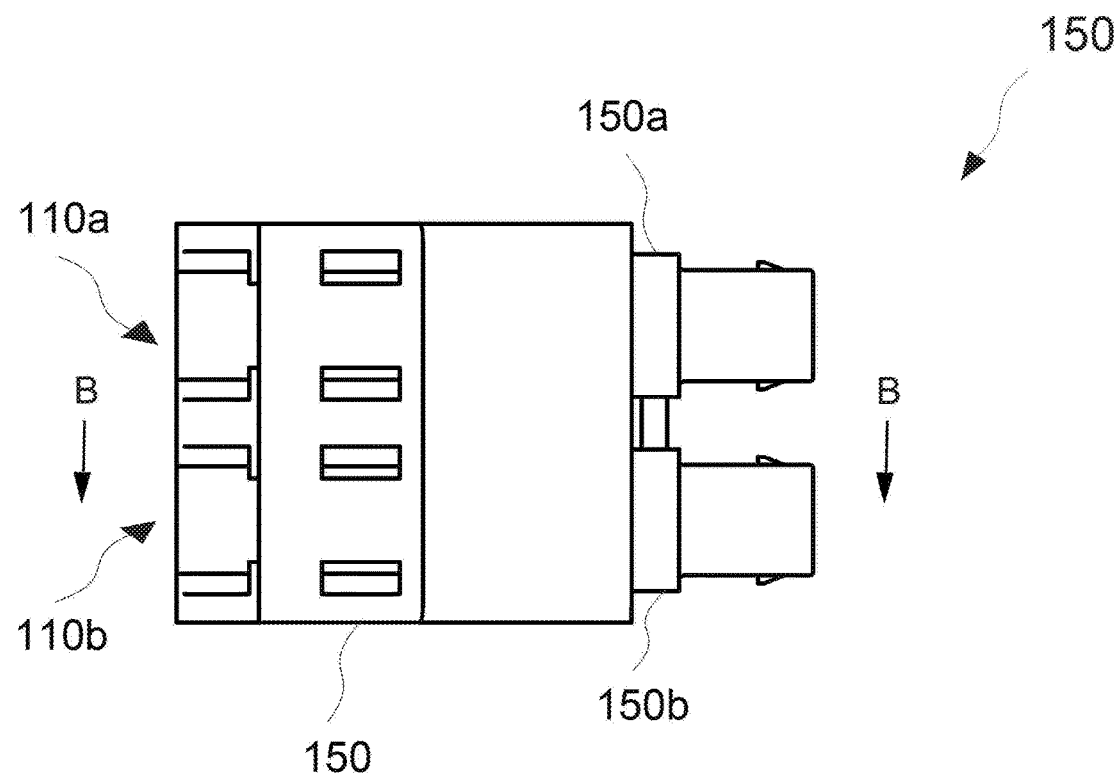
FIG. 5A is a schematic perspective bottom view of a housing having an alignment sleeve therein, according to an example embodiment.
Figure 5B:
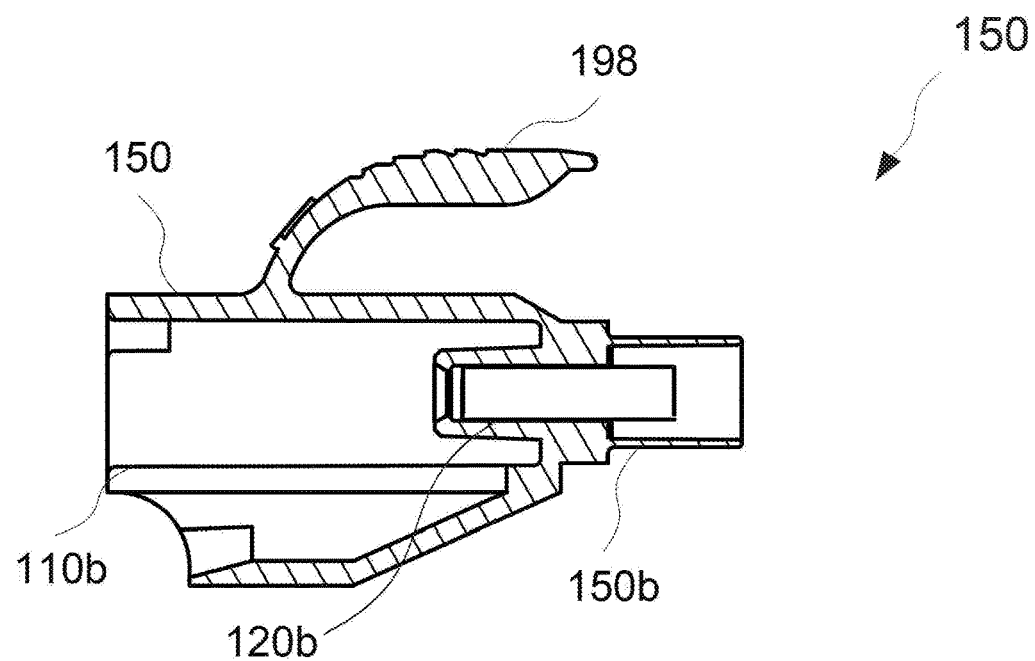
FIG. 5B is a cross-sectional view of the housing of FIG. 5A along line B-B in FIG. 5A, according to an example embodiment.
Figure 6:
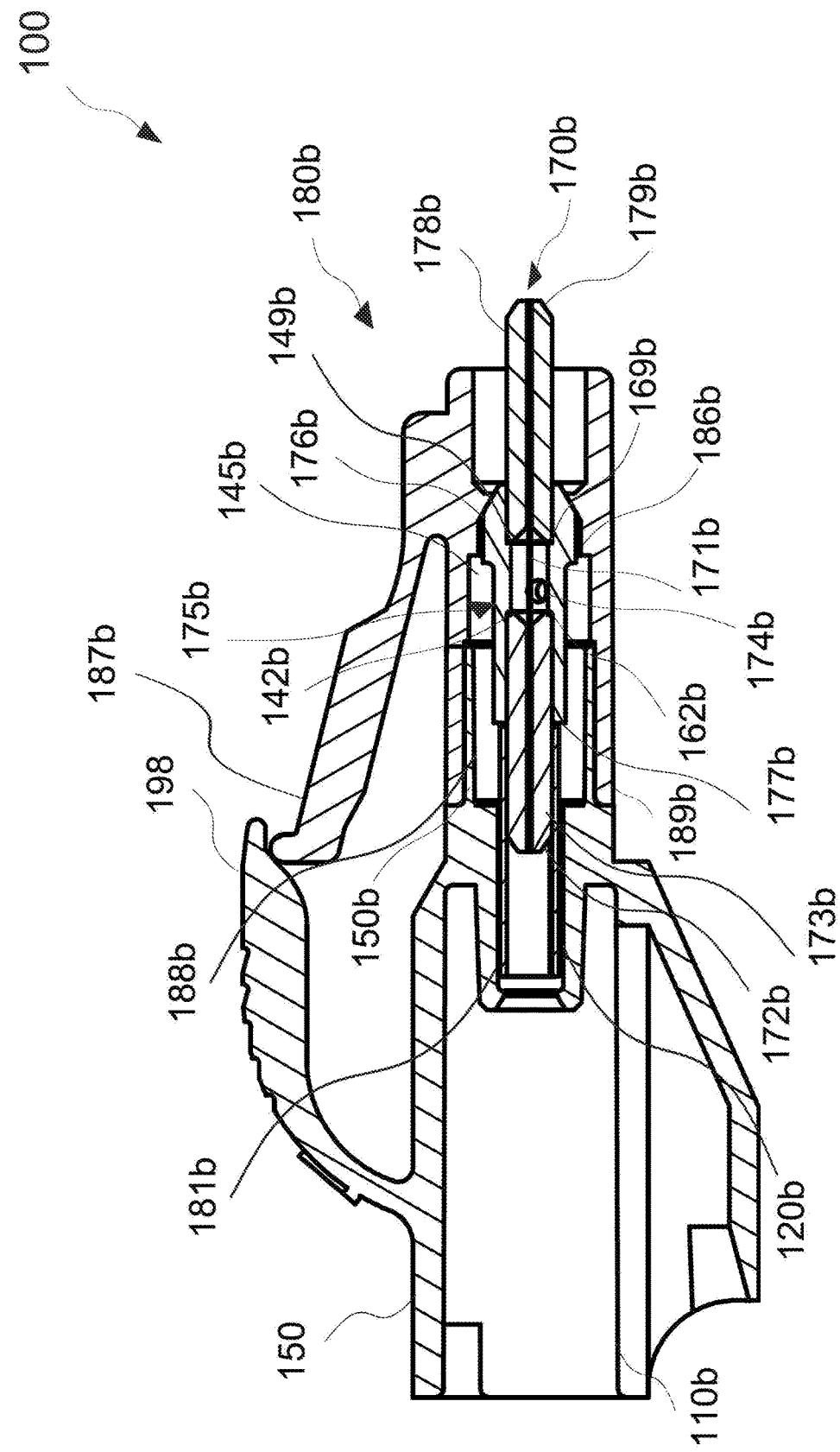
FIG. 6 is a cross-sectional view of the duplex fiber optic adapter of FIG. 1 along line A-A in FIG. 1A, according to an example embodiment.

In some embodiments, each of the optic fiber assemblies 170*a*, 170*b* further comprise an alignment sleeve 181*a*, 181*b* fixedly attached to the stabilizing components 175*a*, 175*b*, respectively, opposite the stop lock collar 176*a*, 176*b*. FIG. 5A is a schematic perspective bottom view of a housing, according to an example embodiment. FIG. 5B is a cross-sectional view of the housing of FIG. 5A along line B-B in FIG. 5A, according to an example embodiment. FIG. 6 is a cross-sectional view of the duplex fiber optic adapter of FIG. 1 along line A-A in FIG. 1A, according to an example embodiment. Referring to FIGS. 5A to 6, and referring to FIGS. 1A to 4C in an embodiment, a length of each alignment sleeve 181*a*, 181*b* is greater than a length of each connecting ferrule 173*a*, 173*b* protruding from the stabilizing component 175*a*, 175*b*. The portion of each alignment sleeve 181*a*, 181*b* not encompassing each connecting ferrule 173*a*, 173*b* is slide-fit engaged to an inner stop ledge in the pair of attachment chambers 188*a*, 188*b*, respectively, stabilizing and aligning optical fiber cores 171*a*, 171*b* of each optic fiber assemblies 170*a*, 170*b* to optical fiber cores 171*a*, 171*b* of the mating connector, respectively.

Figure 7:
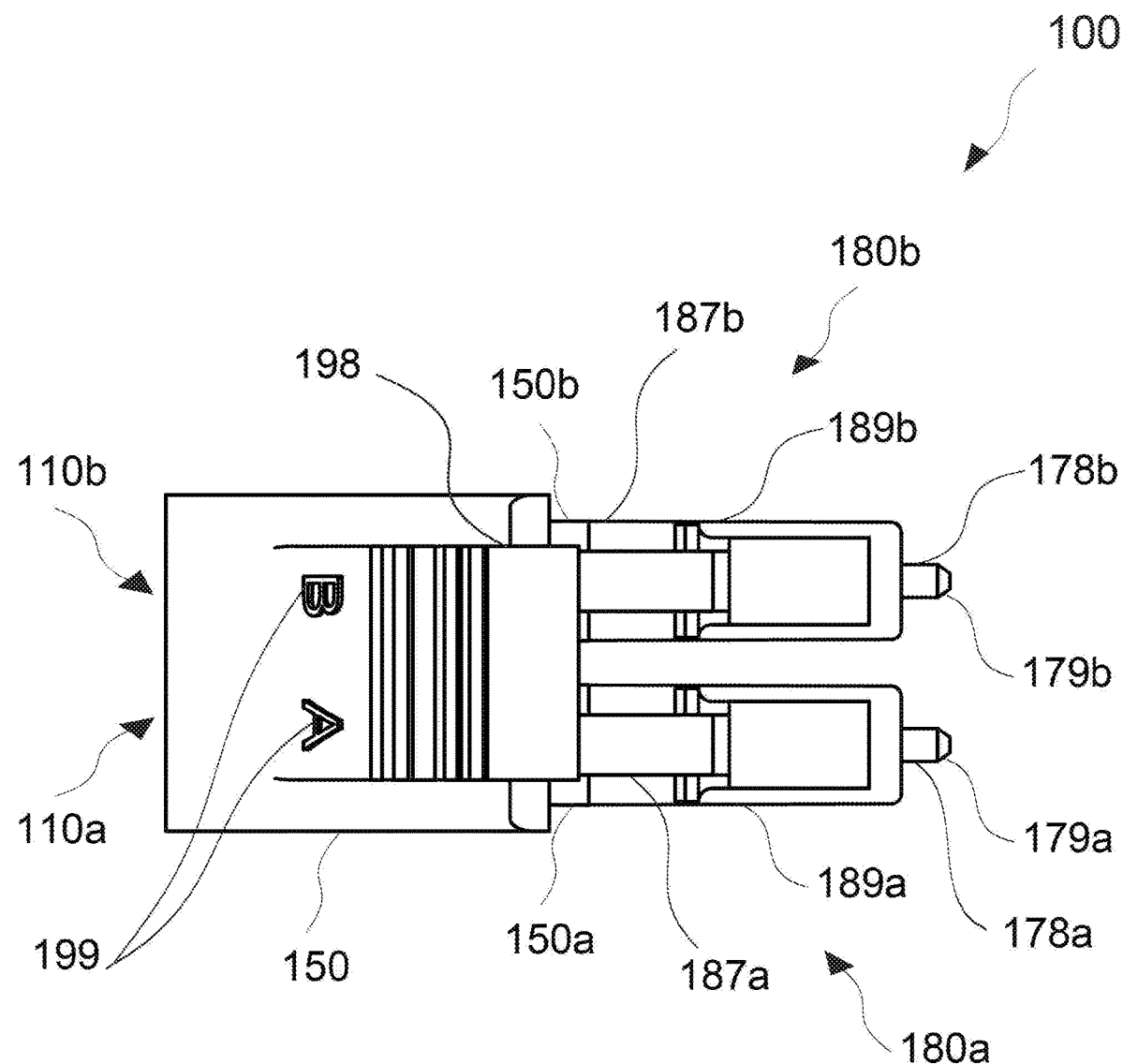
FIG. 7 is a schematic perspective top view of the duplex fiber optic adapter of FIG. 1, according to an example embodiment.

In some embodiments, the duplex fiber optic adapter 100 further comprises identification labels 199 on at least one visible outer surface thereof. FIG. 7 is a schematic perspective top view of the duplex fiber optic adapter of FIG. 1, according to an example embodiment. Referring to FIG. 7, and referring to FIGS. 1A to 6, in the embodiments, the visible outer side is the side where latch features 187*a*, 187*b* and trigger mechanisms 198 for coupling are positioned. The identification labels 199 may comprise other letters, words, symbols, geometric shapes etc. or any combination thereof, and the embodiments are not limited thereto.

Features of the latches and trigger mechanisms may interact with the pair of polarity reversal connector openings 110*a*, 110*b* for engagement of the fiber optic connector (not shown) to the fiber optic adapter 100 and engagement of the fiber optic adapter 100 to the mating fiber optic connector (not shown). Retention features on and within the receiving portions may interact with the latch features 187*a*, 187*b* of the fiber optic connector (not shown) and a trigger feature of the trigger mechanism 198, integrally formed on an outside of the housing 150, may interact with the latch features 187*a*, 187*b* of the pair of fiber optic connector assemblies 180*a*, 180*b*; however, the embodiments are not limited thereto. Other known mechanisms and arrangements may be employed by those of ordinary skill in the relevant art for engagement of the fiber optic connector to the duplex fiber optic adapter 100 and engagement of the duplex fiber optic adapter 100 to the mating fiber optic connector, and the embodiments are not limited thereto.

In an embodiment of a duplex fiber optic connector system for providing a reversal polarity connection between fiber optic connectors via a duplex fiber optic adapter 100, the system further comprises an LC duplex fiber optic connector (not shown). The duplex fiber optic adapter 100 in the system is as described in detail in the embodiments, and for sake of brevity, will not repeated hereafter.

In an embodiment, a method of changing a polarity connection between fiber optic connectors via a duplex fiber optic adapter 100 is provided. The method comprises turning the fiber optic connector (not shown) 180° degrees, engaging the fiber optic connector (not shown) to the duplex fiber optic adapter 100 and engaging the adapter 100 to the mating fiber optic connector (not shown) (not shown). The duplex fiber optic adapter 100 of the method is as described in detail in the embodiments, and for sake of brevity, will not repeated hereafter.

The embodiment of the method of changing the polarity connection between fiber optic connectors via the duplex fiber optic adapter 100 is fast, efficient, and mistake-free. No disassembly is required, no adjustment to connectors is required, and all that is required is turning the fiber optic connector 180° degrees, engagement of the fiber optic connector to the duplex fiber optic adapter 100 and engagement of the adapter 100 to the mating fiber optic connector for polarity reversal optical connection.

Figure 8A:
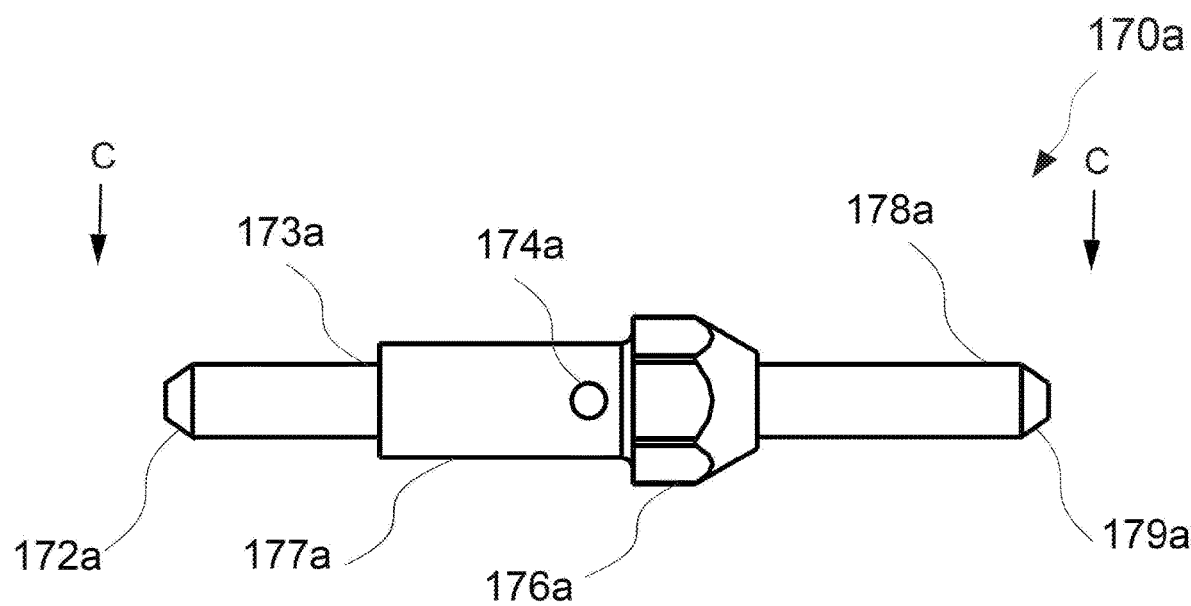
FIG. 8A is a schematic perspective view of an optic fiber assembly, according to an example embodiment.
Figure 8B:
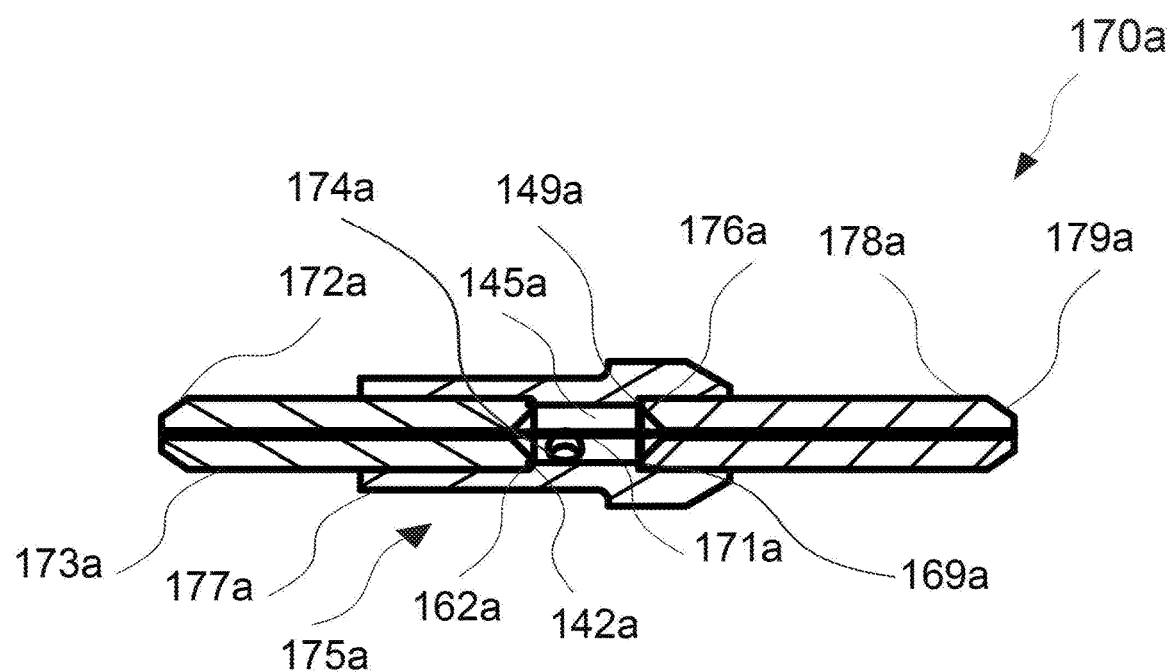
FIG. 8B is a cross-sectional view of the optic fiber assembly of FIG. 8A along line C-C in FIG. 8A, according to an example embodiment.
Figure 9:
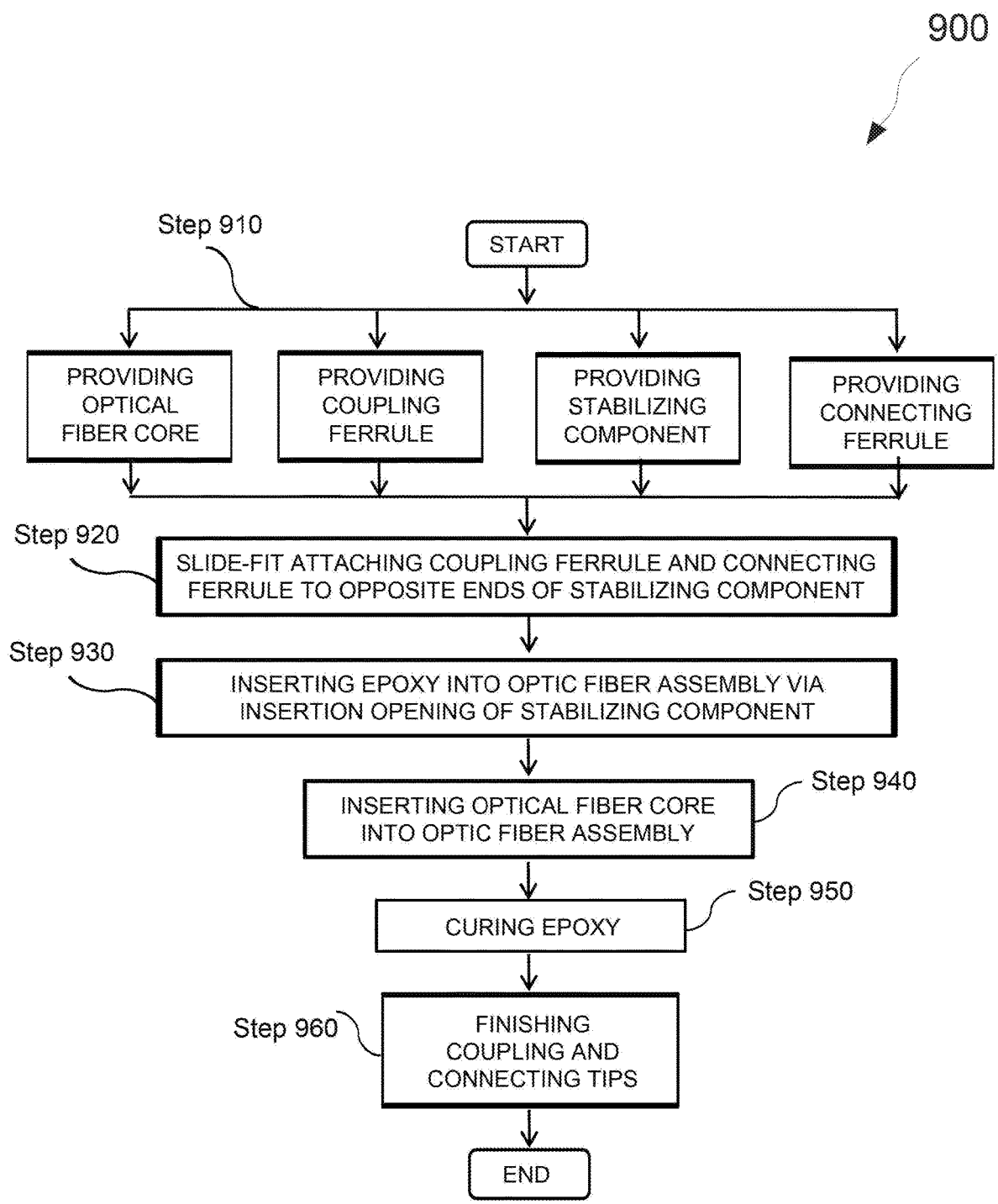
FIG. 9 is a method of preparing an optic fiber assembly, according to an example embodiment.

FIG. 8A is a schematic perspective view of an optic fiber assembly, according to an example embodiment. FIG. 8B is a cross-sectional view of the optic fiber assembly of FIG. 8A along line C-C in FIG. 8A, according to an example embodiment. FIG. 9 is a method of preparing an optic fiber assembly, according to an example embodiment. Referring to FIGS. 8A to 9, and referring to FIGS. 1A to 8B, in an embodiment, a method of preparing an optic fiber assembly 170*a*, 170*b* is provided, whereby the optic fiber assembly 170*a*, 170*b* is configured for optical energy transmission therethrough, the method comprises the following steps. First, in Step 910, an optical fiber core 171*a*, 171*b*, a coupling ferrule 178*a*, 178*b* having a bore extending axially therethrough, a connecting ferrule 173*a*, 173*b* having a bore extending axially therethrough, and a stabilizing component 175*a*, 175*b*, defining an interior channel therethrough, having an insertion opening 174*a*, 174*b* on a side therethrough are provided. Thereafter, in Step 920, a coupling end 169*a*, 169*b* of the coupling ferrule 178*a*, 178*b* is fixedly slide-fit attached to a coupling inner stop ledge 149*a*, 149*b* of the stabilizing component 175*a*, 175*b* on one end and a connecting end 162*a*, 162*b* of the connecting ferrule 173*a*, 173*b* is fixedly slide-fit attached to a connecting inner stop ledge 142*a*, 142*b* of the stabilizing component 175*a*, 175*b* on an opposite end. The coupling inner stop ledge 149*a*, 149*b* and connecting inner stop ledge 142*a*, 142*b* are different stop ledges, and an insertion space 145*a*, 145*b* is positioned between the coupling inner stop ledge 149*a*, 149*b* and connecting inner stop ledge 142*a*, 142*b* and communicates with the insertion opening 174*a*, 174*b*. Next, in Step 930 epoxy is prepared and inserted into the insertion opening 174a, 174b, filling up the insertion space 145a, 145b and bores of the coupling ferrule 178a, 178b and connecting ferrule 173a, 173b, whereby a bead of epoxy protrudes from a coupling tips 179a, 179b of the coupling ferrule 178a, 178b and connecting tips 172a, 172b of the connecting ferrule 173a, 173b. The epoxy beads protect the optical fiber core 171a, 171b protruding from the coupling and connecting tip 179a, 179b and prevent breaking off of the optical fiber core 171a, 171b inside of the coupling and connecting tip 179a, 179b, respectively, during subsequent processes. Via the positioning of the insertion opening 174a, 174b and insertion space 145a, 145b communicating with the coupling and connecting ferrule 178a, 178b, 173a, 173b via the coupling end 169a, 169b and connecting end 162a, 162b, respectively, substantially complete and even filling of the insertion space 145a, 145b and bores of the coupling ferrule 178a, 178b and connecting ferrule 173a, 173b is achieved, whereby no concern of epoxy running out of the back of the coupling and/or connecting ends 169a, 169b, 162a, 162b, or uneven curing of the epoxy within the insertion space 145a, 145b, bore of the coupling ferrule 178a, 178b, and/or bore of the connecting ferrule 173a, 173b, or any combination thereof, is required. Thus, high loss or high reflectance caused by poor technique during the epoxy insertion step is decreased. Following, in Step 940, the optical fiber core 171a, 171b is inserted through the connecting ferrule 173a, 173b, insertion space 145a, 145b of the stabilizing component 175a, 175b and coupling ferrule 178a, 178b. The length of the optical fiber core 171a, 171b is greater than the length of the connecting ferrule 173a, 173b, insertion space 145a, 145b and coupling ferrule 178a, 178b, whereby following insertion, the bead of epoxy protrudes from the coupling and connecting tip 179a, 179b, 172a, 172b having the optical fiber therethrough. Next, in Step 950, the epoxy is cured and following, in Step 960, the coupling and connecting tip 179a, 179b, 172a, 172b are finished.

In some embodiments of the method of preparing the optic fiber assembly 170a, 170b, the stabilizing component 175a, 175b further comprises a stop lock collar 176a, 176b and a component sleeve 177a, 177b integrated therewith, wherein the shape of the stop lock collar 176a, 176b comprises at least one angle, and wherein the stop lock collar 176a, 176b encompasses the coupling end 169a, 169b and a portion of the insertion space 145a, 145b and the component sleeve 177a, 177b encompasses another portion of the insertion space 145a, 145b and connecting end 162a, 162b.

In some embodiments of the method of preparing the optic fiber assembly 170a, 170b, the optic fiber assembly 170a, 170b further comprises an alignment sleeve 181a, 181b fixedly attached to the stabilizing component 175a, 175b, opposite the stop lock collar 176a, 176b, whereby a length of the alignment sleeve 181a, 181b is greater than a length of the connecting ferrule 173a, 173b protruding from the stabilizing component 175a, 175b.

In the embodiments, any type of epoxy known by those skilled in the relevant art may be employed in the method of preparing the optic fiber assembly 170a, 170b, and the embodiments are not limited thereto. As long as the epoxy may act as an electrical insulator, distribute stress load evenly over a broad area, reducing strain on joints, resist flex and vibration stresses, and form a seal as well as a bond to protect internal components from the environment.

Those of ordinary skill in the relevant art may readily appreciate that various tools and techniques may be used to implement the processes of the method of preparing the optic fiber assembly 170a, 170b. Also, those of ordinary skill in the relevant art may readily appreciate that additional steps can be added to the method in order to incorporate additional features into the finished product. By way of example, before the providing the optical fiber core 171a, 171b, the optical fiber core 171a, 171b can first be prepared, and in Step 6, finishing of the coupling and connecting tip 179a, 179b, 172a, 172b may comprise cleaving and polishing processes, and further steps comprising inspection and testing processes may be added, and the embodiments are not limited thereto. Furthermore, the steps can be altered depending upon different requirements.

In some embodiments, the housing 150, pair of ports 120a, 120b, and pair of opening structures 150a, 150b are integrally formed and each of the pair of coupling housings 189a, 189b of the fiber optic connector assemblies 180a, 180b is integrally formed. The housing 150 and each of the pair of coupling housings 189a, 189b are made of a suitable thermoplastic or thermoset polymer material by methods known by those skilled in the relevant art. Those of skill in the relevant art may readily appreciate that the housing 150 and the pair of coupling housings 189a, 189b may be formed in more than one portion and may be made of more than one material and assembled thereafter, and the embodiments are not limited thereto.

In some embodiments, the optical fiber core 171a, 171b may be any suitable optic fiber cable or cables known by those of ordinary skill in the relevant art and are not limited. By way of example, the optical fiber core 171a, 171b may include two unbuffered optical fibers generally surrounded by one or more strength elements and a cable jacket; however, other variations of the fiber optic cable may include buffered optical fibers and/or eliminate the strength elements or jacket.

With a rise in online and offline connectivity, supporting infrastructural technologies are proliferating in advancement and innovation. Fiber optics enables high-speed data transfer in both small and long-range communications. It also serves as a medium to cope with increasing bandwidth requirements associated with broadband services, network operators, and broadband connection providers.

The exploding demand for data volumes and data rates have resulted in existing data centers being upgraded and new data centers begin built. Often, there are multiple adapters and cable segments connected in a data center, with the polarity of the connectors used changing not just once, but, several times during deployment. The problem of poor fiber connection alignment and/or crossing of fiber optic cables during installation have increased, whereby a transmit signal (Tx) port and receiver (Rx) port of an LC duplex fiber optic connector is mistakenly not connected to a receiver (Rx) port and a transmit signal (Tx) port of a corresponding LC duplex fiber optic connector, respectively.

In the embodiments, duplex fiber optic adapters, comprising a pair of fiber optic connector assemblies, a housing and a pair of ports positioned within the housing is provided. The housing has a pair of opening structures on one end, configured for fixed attachment of the pair of fiber optic connector assemblies, and a pair of polarity reversal connector openings on an opposing end, configured to receive a pair of ferrules of a fiber optic connector. When a fiber optic connector is inserted into the adapter and the adapter is coupled to a mating fiber optic connector, the pair of ferrules is engaged in the pair of ports of the housing and coupling ferrules of each, pair of fiber optic connector assemblies is engaged in a pair of ports of the mating fiber optic connector, establishing a polarity reversal connection between the fiber optic connector and mating fiber optic connector via the adapter.

The embodiments of the duplex fiber optic adapter allow for cabling infrastructure in data centers, as an example, to be even more reliable, easier to install, modular and flexible, to accommodate changes and data center growth. When switching of polarities is required, no re-termination is needed. Thus, time is saved, risk of human error is mitigated, and no special tool is required for completion. Via the pair of fiber optic connector assemblies and pair of polarity reversal connector openings, all that is required for the switching of polarities is for the fiber optic connector to be turned 180° degrees, engaged in the pair of polarity reversal connector openings, and coupled to the mating fiber optic connector via the adapter, mitigating non-precise alignment, wrong connections, signal degradation, damaged equipment or devices, or signals not being transmitted. Alignment between the pair of ferrules of the fiber optic connector and optic fiber assemblies, and optic fiber assemblies and the pair of ferrules of the mating fiber optic connector are assured with modulated mating of the pair of ports of the housing and stabilizing components, and alignment sleeves of each of the optic fiber assemblies at approximate mid-points, respectively. Also, as no manual adjustment is needed for the connectors, the risk of non-precise alignment of the optical fiber cores is further mitigated. Additionally, the positioning of the insertion opening and insertion space communicating with the coupling and connecting ferrule via the coupling end and connecting end, respectively, results in substantially complete and even filling of the insertion space and bores of the coupling ferrule and connecting ferrule. Thus, no concern of epoxy running out of the back of the coupling and/or connecting ferrule, or uneven curing of the epoxy within the insertion space, bore of the coupling ferrule, and/or bore of the connecting ferrule, or any combination thereof, is required. Accordingly, high loss or high reflectance caused by poor technique during the epoxy insertion step during preparation of an optic fiber assembly is decreased.

The presently disclosed inventive concepts are not intended to be limited to the embodiments shown herein, but are to be accorded their full scope consistent with the principles underlying the disclosed concepts herein. Directions and references to an element, such as "up," "down," "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean, subranges and/or an upper or lower limit. AH structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A duplex fiber optic adapter, comprising:
 a pair of fiber optic connector assemblies, configured to couple to a mating fiber optic connector, each including an optic fiber assembly having an optical fiber core, a coupling ferrule, a connecting ferrule and a stabilizing component comprising a stop lock collar portion and a component sleeve portion integrated therewith, and a coupling housing having an attachment chamber and a stop lock receiving structure on one end of the attachment chamber, wherein the coupling ferrule is fixedly attached to the stabilizing component on one end and protrudes outwardly therefrom and the connecting ferrule is fixedly attached to the stabilizing component on an opposite end and protrudes outwardly therefrom and the optical fiber core is positioned at a central axis therein, and wherein the stop lock receiving structure is configured to fixedly secure the optic fiber assembly therein, and a shape of the stop lock receiving structure and a shape of the stop lock collar portion comprises at least one corresponding angle, respectively;
 a housing having a pair of opening structures on one end thereof, configured for fixed attachment of the pair of fiber optic connector assemblies, respectively, and a pair of polarity reversal connector openings on an opposing end of the housing, opposite the pair of opening structures, configured to receive a pair of ferrules of a fiber optic connector; and
 a pair of ports positioned within the housing, configured to receive the pair of ferrules of the fiber optic connector and each connecting ferrule of the optic fiber assemblies, respectively, and establish an optical connection therebetween,
 wherein each coupling housing is configured to fixedly snap fit attach to the pair of opening structures, respectively,
 whereby rotational movement of each of the stabilizing components is prevented via the corresponding shapes of the stop lock receiving structure and stop lock collar portion, and each of the coupling ferrule and connecting ferrule is fixedly slide-fit attached to coupling inner stop ledges and connecting inner stop ledges of the stabilizing components from the stop lock collar portion and component sleeve portion, respectively, stabilizing and aligning each of the optical fiber cores of each of the optic fiber assemblies, respectively, and
 whereby when the fiber optic connector is inserted into the adapter and the pair of fiber optic connector assemblies of the adapter are coupled to the mating fiber optic connector, latch clip assemblies of the fiber optic connector are engaged within the pair of polarity reversal connector openings and the pair of ferrules is engaged in the pair of ports of the housing, respectively, and latch clip assemblies of the pair of fiber optic connector assemblies are engaged within the mating fiber optic connector and each coupling ferrule is engaged in a pair of ports of the mating fiber optic connector, whereby a polarity reversal connection is established between the fiber optic connector and mating fiber optic connector via the adapter.

2. The duplex fiber optic adapter of claim 1, wherein each of the optic fiber assemblies further comprise an alignment sleeve fixedly attached to the stabilizing components, respectively, opposite the stop lock collar portion, whereby a length of each alignment sleeve is greater than a length of each connecting ferrule protruding from the stabilizing component, and whereby the portion of each alignment sleeve not encompassing each connecting ferrule, is slide-fit engaged to an inner stop ledge in the pair of attachment chambers, respectively, stabilizing and aligning optical fiber cores of each optic fiber assemblies to optical fiber cores of the mating connector, respectively.

3. A duplex fiber optic connector system for providing a reversal polarity connection between fiber optic connectors via a duplex fiber optic adapter, comprising:
   a fiber optic connector; and
   a fiber optic adaptor, comprising:
      a pair of fiber optic connector assemblies, configured to couple to a mating fiber optic connector, each including an optic fiber assembly having an optical fiber core, a coupling ferrule, a connecting ferrule and a stabilizing component comprising a stop lock collar portion and a component sleeve portion integrated therewith, and a coupling housing having an attachment chamber and a stop lock receiving structure on one end of the attachment chamber, wherein the coupling ferrule is fixedly attached to the stabilizing component on one end and protrudes outwardly therefrom and the connecting ferrule is fixedly attached to the stabilizing component on an opposite end and protrudes outwardly therefrom and the optical fiber core is positioned at a central axis therein, and wherein the stop lock receiving structure is configured to fixedly secure the optic fiber assembly therein, and a shape of the stop lock receiving structure and a shape of the stop lock collar portion comprises at least one corresponding angle, respectively;
      a housing having a pair of opening structures on one end thereof, configured for fixed attachment of the pair of fiber optic connector assemblies, respectively, and a pair of polarity reversal connector openings on an opposing end of the housing, opposite the pair of opening structures, configured to receive a pair of ferrules of the fiber optic connector; and
      a pair of ports positioned within the housing, configured to receive the pair of ferrules of the fiber optic connector and each connecting ferrule of the optic fiber assemblies, respectively, and establish an optical connection therebetween,
   wherein each coupling housing is configured to fixedly snap fit attach to the pair of opening structures, respectively,
   whereby rotational movement of each of the stabilizing components is prevented via the corresponding shapes of the stop lock receiving structure and stop lock collar portion, and each of the coupling ferrule and connecting ferrule is fixedly slide-fit attached to coupling inner stop ledges and connecting inner stop ledges of the stabilizing components from the stop lock collar portion and component sleeve portion, respectively, stabilizing and aligning each of the optical fiber cores of each of the optic fiber assemblies, respectively, and
   whereby when the fiber optic connector is inserted into the adapter and the pair of fiber optic connector assemblies of the adapter are coupled to the mating fiber optic connector, latch clip assemblies of the fiber optic connector are engaged within the pair of polarity reversal connector openings and the pair of ferrules is engaged in the pair of ports of the housing, respectively, and latch clip assemblies of the pair of fiber optic connector assemblies are engaged within the mating fiber optic connector and each coupling ferrule is engaged in a pair of ports of the mating fiber optic connector, whereby a polarity reversal connection is established between the fiber optic connector and mating fiber optic connector via the adapter.

4. The duplex fiber optic system of claim 3, wherein each of the optic fiber assemblies further comprise an alignment sleeve fixedly attached to the stabilizing components, respectively, opposite the stop lock collar portion, whereby a length of each alignment sleeve is greater than a length of each connecting ferrule protruding from the stabilizing component, and whereby the portion of each alignment sleeve not encompassing each connecting ferrule, is slide-fit engaged to an inner stop ledge in the pair of attachment chambers, respectively, stabilizing and aligning optical fiber cores of each optic fiber assemblies to optical fiber cores of the mating connector, respectively.

* * * * *